US011712807B2

(12) United States Patent
Hyuga (10) Patent No.: US 11,712,807 B2
(45) Date of Patent: Aug. 1, 2023

(54) IMAGE PROCESSING APPARATUS, ROBOT AND ROBOT SYSTEM

(71) Applicant: Seiko Epson Corporation, Tokyo (JP)

(72) Inventor: Takashi Hyuga, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 883 days.

(21) Appl. No.: 16/420,280

(22) Filed: May 23, 2019

(65) Prior Publication Data

US 2019/0358819 A1 Nov. 28, 2019

(30) Foreign Application Priority Data

May 25, 2018 (JP) ................................. 2018-100347

(51) Int. Cl.
  *B25J 9/16* (2006.01)
  *G06T 7/90* (2017.01)
  *G06K 7/14* (2006.01)

(52) U.S. Cl.
  CPC .......... *B25J 9/1697* (2013.01); *G06K 7/1417* (2013.01); *G06K 7/1443* (2013.01); *G06K 7/1447* (2013.01); *G06T 7/90* (2017.01)

(58) Field of Classification Search
  CPC .......... B25J 9/1697; B25J 9/161; B25J 19/04; G06K 7/1417; G06K 7/1443; G06K 7/1447; G06T 7/90; G06V 30/224; G06V 20/10
  See application file for complete search history.

(56) References Cited

U.S. PATENT DOCUMENTS 9,227,323 B1* 1/2016 Konolige ............... G06T 19/003
2005/0154489 A1 7/2005 Sone et al.
2016/0364869 A1 12/2016 Siercks et al.

FOREIGN PATENT DOCUMENTS

| CN | 106249694 A | 12/2016 |
| JP | S61-025284 A | 2/1986 |
| JP | H04319786 A | 11/1992 |
| JP | H085316 A | 1/1996 |
| JP | 2005-190102 A | 7/2005 |
| JP | 2008271239 A | 11/2008 |
| JP | 2010-081228 A | 4/2010 |
| JP | 2012181705 A | 9/2012 |
| JP | 2015072586 A | 4/2015 |

OTHER PUBLICATIONS

F. Okura, Y. Ueda, T. Sato and N. Yokoya, "Teleoperation of mobile robots by generating augmented free-viewpoint images," 2013 IEEE/RSJ International Conference on Intelligent Robots and Systems, 2013, pp. 665-671, doi: 10.1109/IROS.2013.6696422. (Year : 2013).*

* cited by examiner

*Primary Examiner* — Matthew Mikels
(74) *Attorney, Agent, or Firm* — Gang Yu

(57) ABSTRACT

An image processing apparatus includes a processor. The processor accepts a captured image generated by capturing an image of a target object, detects identification information for identifying the target object by processing the captured image, and generates a combined image that is the combination of the captured image and the identification information and causes a display apparatus to display the combined image. In the combined image, the identification information is superimposed on the target object in the captured image.

13 Claims, 12 Drawing Sheets

IMAGE PROCESSING APPARATUS, ROBOT AND ROBOT SYSTEM

The present application is based on, and claims priority from JP Application Serial Number 2018-100347, filed on May 25, 2018, the disclosure of which is hereby incorporated by reference herein in its entirety.

BACKGROUND

1. Technical Field

The present disclosure relates to a technology for capturing an image of a target object and performing image processing.

2. Related Art

A variety of apparatuses, such as a robot, use a technology for capturing an image of a subject with a camera, processing the image to recognize the subject, and causing a robot to work on the subject. JP-A-2010-081228 discloses a technology for detecting and recognizing a product number or a serial number on a workpiece with a camera for product management, distribution management, and other types of operation. In the technology described above, the coordinates of a detected region and other pieces of information are displayed in a detailed result area adjacent to an image of the workpiece.

JP-A-2010-081228 is an example of the related art.

In the technology of the related art described above, however, in which identification information, such as the product number or the serial number on the target object, is merely displayed in the form of an image captured with the camera in a different place separate from the target object, it is difficult for an operator to look at the result of the recognition and the target object at the same time, resulting in a problem of a difficulty in determination of whether or not the result of the recognition of the identification information is correct.

SUMMARY

According to an aspect of the present disclosure, there is provided an image processing apparatus that detects identification information for identifying an imaged target object and causes a display apparatus to display the identification information. The image processing apparatus includes an image acceptance section that accepts a captured image generated by capturing an image of the target object, a detection section that detects the identification information for identifying the target object by processing the captured image, and a combined image generation section that generates a combined image that is the combination of the captured image and the identification information and causes the display apparatus to display the combined image. In the combined image, the identification information is superimposed on the target object in the captured image.

DESCRIPTION OF EXEMPLARY EMBODIMENTS

A. First Embodiment

Figure 1:
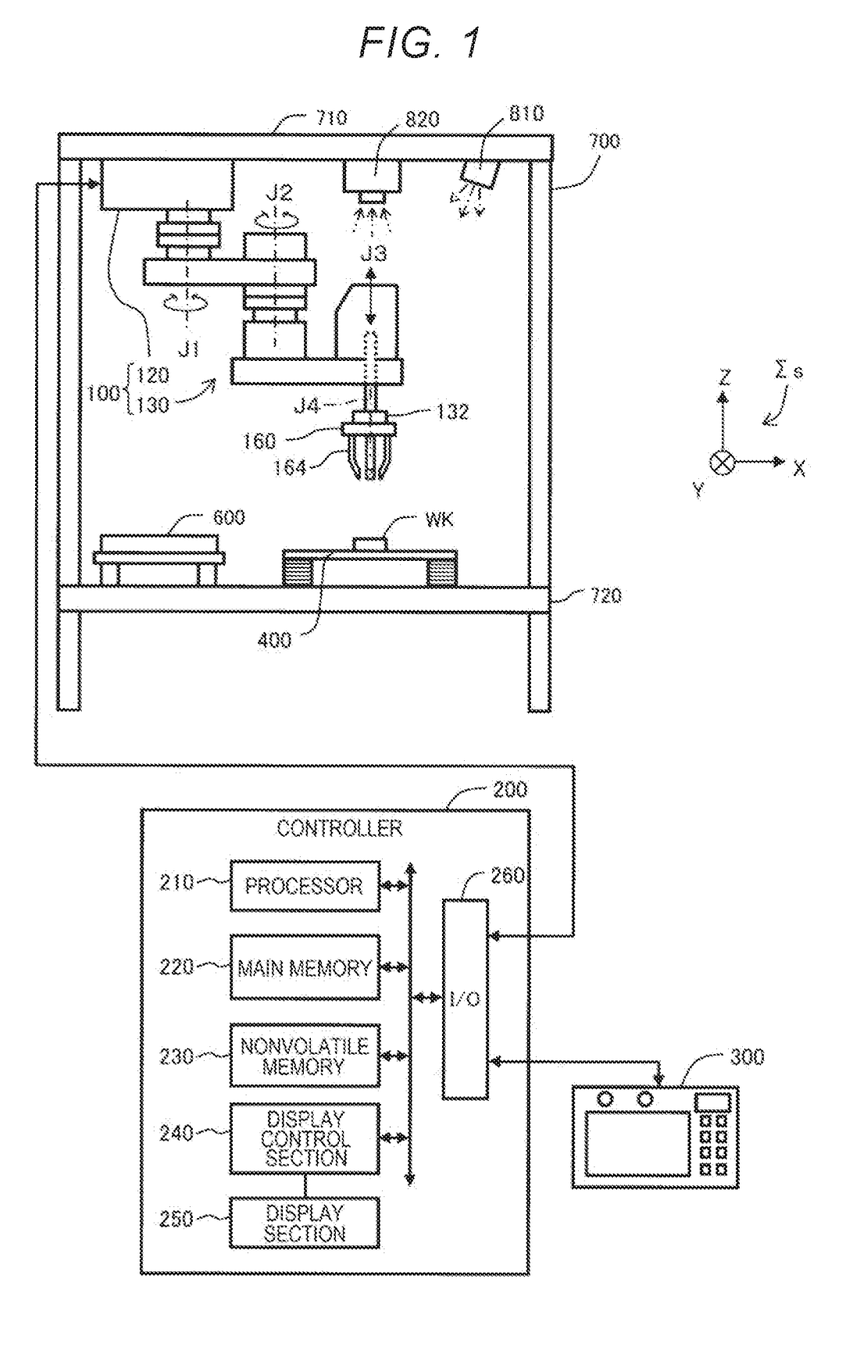
FIG. 1 is a conceptual view of a robot system.

FIG. 1 is a conceptual view of a robot system. The robot system is installed in a mount 700 and includes a robot 100, a controller 200, which is connected to the robot 100, a teaching pendant 300, a conveyer 400, a tray 600, a strobe light 810, and a camera 820. The robot 100 is fixed to the lower surface of a top plate 710 of the mount 700. The tray 600 is placed on a table section 720 of the mount 700. The conveyer 400 sequentially conveys a plurality of workpieces WK, which are each a target object, to a position where the robot 100 works. The workpieces WK are each conveyed in the direction perpendicular to the plane of view. The upper surface of the conveyer 400 forms the path along which the workpieces WK are conveyed.

The robot 100 is a teaching-playback-type robot. The robot 100 works in accordance with teaching data created in advance. A system coordinate system Σs specified by three coordinate axes X, Y, and Z perpendicular to one another is set in the robot system. In the example shown in FIG. 1, the axes X and Y extend in the horizontal direction, and the axis Z extends toward the upper side of the vertical direction. Teaching points contained in the teaching data and the attitude of an end effector are each expressed by the coordinates in the system coordinate system Σs and angles around the axes.

The robot 100 includes a base 120, and an arm 130. The arm 130 is divided into portions sequentially connected to each other via four joints J1 to J4. Out of the joints J1 to J4, three joints or the joints J1, J2, and J4 are each a twisting joint, and one joint or the joint J3 is a translating joint. The four-axis robot is presented by way of example in the present embodiment, and a robot having an arbitrary arm mechanism having one or more joints may instead be used.

An end effector 160 is attached to an arm flange 132 provided at the front end of the arm 130. In the example shown in FIG. 1, the end effector 160 is a gripper that grips and picks up a workpiece WK by using a grip mechanism 164. The end effector 160 can instead be another mechanism, such as a sucking pickup mechanism. In the present embodiment, the robot 100 picks up a workpiece WK conveyed by the conveyer 400 and stores the workpiece WK in an appropriate position on the tray 600. The robot system can also be used in any other type of work.

The controller 200 includes a processor 210, a main memory 220, a nonvolatile memory 230, a display control section 240, a display section 250, and an I/O interface 260. The portions described above are connected to each other via a bus. The processor 210 is, for example, a microprocessor or a processor circuit. The controller 200 is connected to the robot 100, the teaching pendant 300, and the conveyer 400 via the I/O interface 260. The controller 200 is also connected to the strobe light 810 and the camera 820 via the I/O interface 260.

The configuration of the controller 200 can be any of a variety of configurations other than the configuration shown in FIG. 1. For example, the processor 210 and the main memory 220 may be removed from the controller 200 in FIG. 1, and another apparatus communicably connected to the controller 200 may be provided with the processor 210 and the main memory 220. In this case, the apparatus that is the combination of the other apparatus and the controller 200 as a whole functions as the controller of the robot 100. In another embodiment, the controller 200 may include two or more processors 210. In still another embodiment, the controller 200 may be achieved by a plurality of apparatuses communicably connected to each other. In the variety of embodiments described above, the controller 200 is configured as an apparatus or an apparatus group including one or more processors 210.

Figure 2:
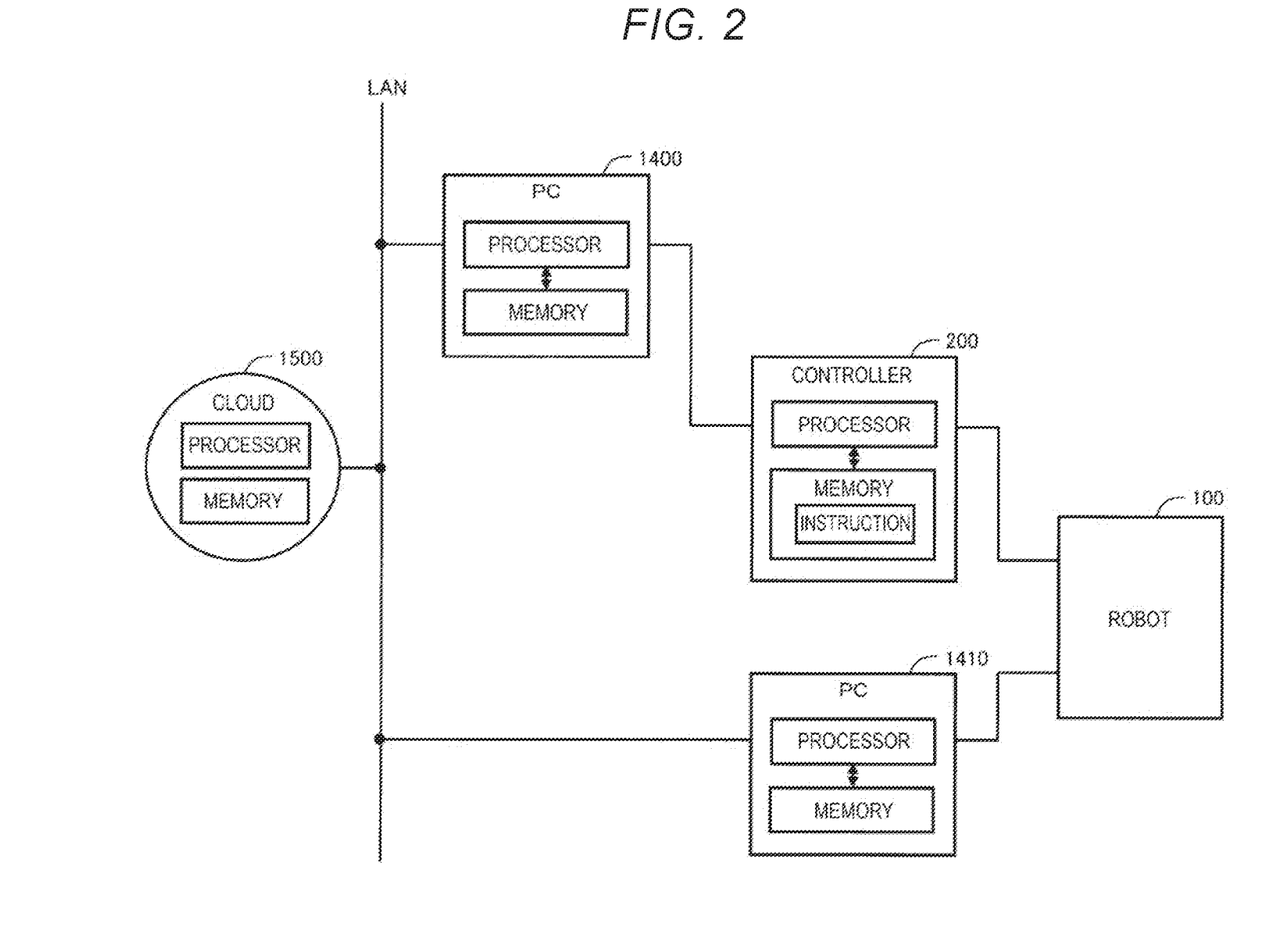
FIG. 2 is a conceptual view showing an example of a controller including a plurality of processors.

FIG. 2 is a conceptual view showing an example in which a plurality of processors form the controller of the robot. In the example, in addition to the robot 100 and the controller 200 associated therewith, personal computers 1400 and 1410 and cloud service 1500 provided via a network environment, such as a LAN, are drawn. The personal computers 1400 and 1410 each include a processor and a memory. The cloud service 1500 can also use a processor and a memory. The controller of the robot 100 can be achieved by using part or entirety of the plurality of processors.

Figure 3:
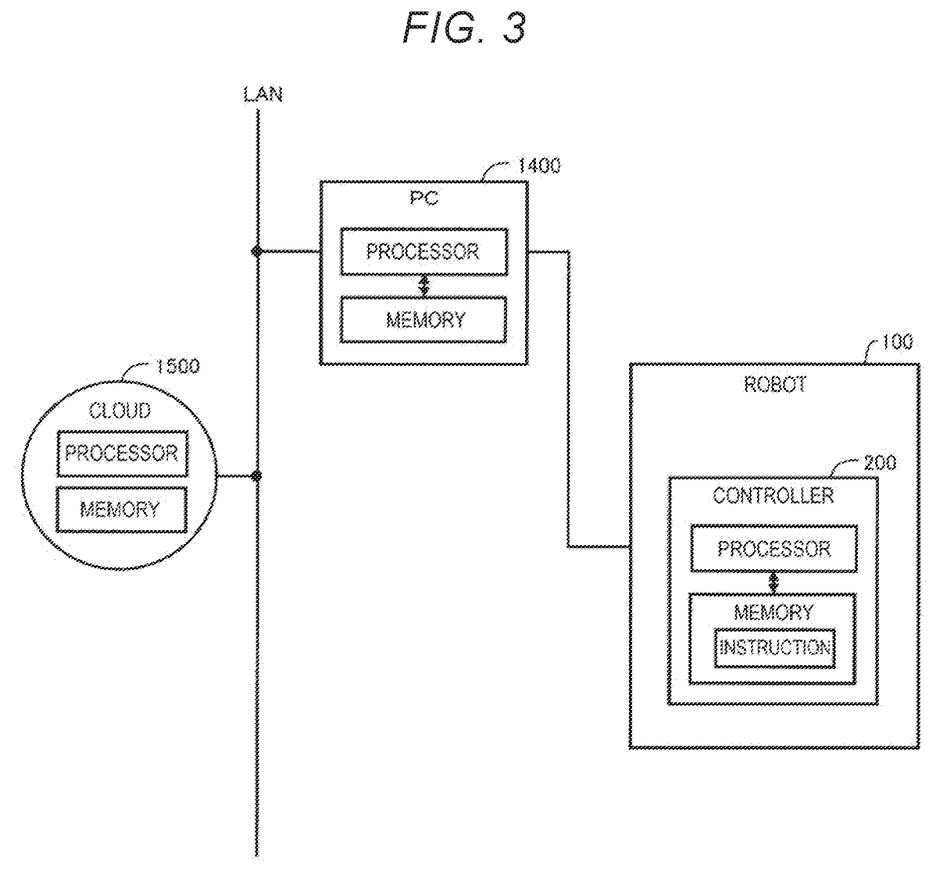
FIG. 3 is a conceptual view showing another example of the controller including a plurality of processors.

FIG. 3 is a conceptual view showing another example in which a plurality of processors form the controller of the robot. The example shown in FIG. 3 differs from the example shown in FIG. 2 in that the controller 200 of the robot 100 is accommodated in the robot 100. Also in this example, the controller of the robot 100 can be achieved by using part or entirety of the plurality of processors.

Figure 4:
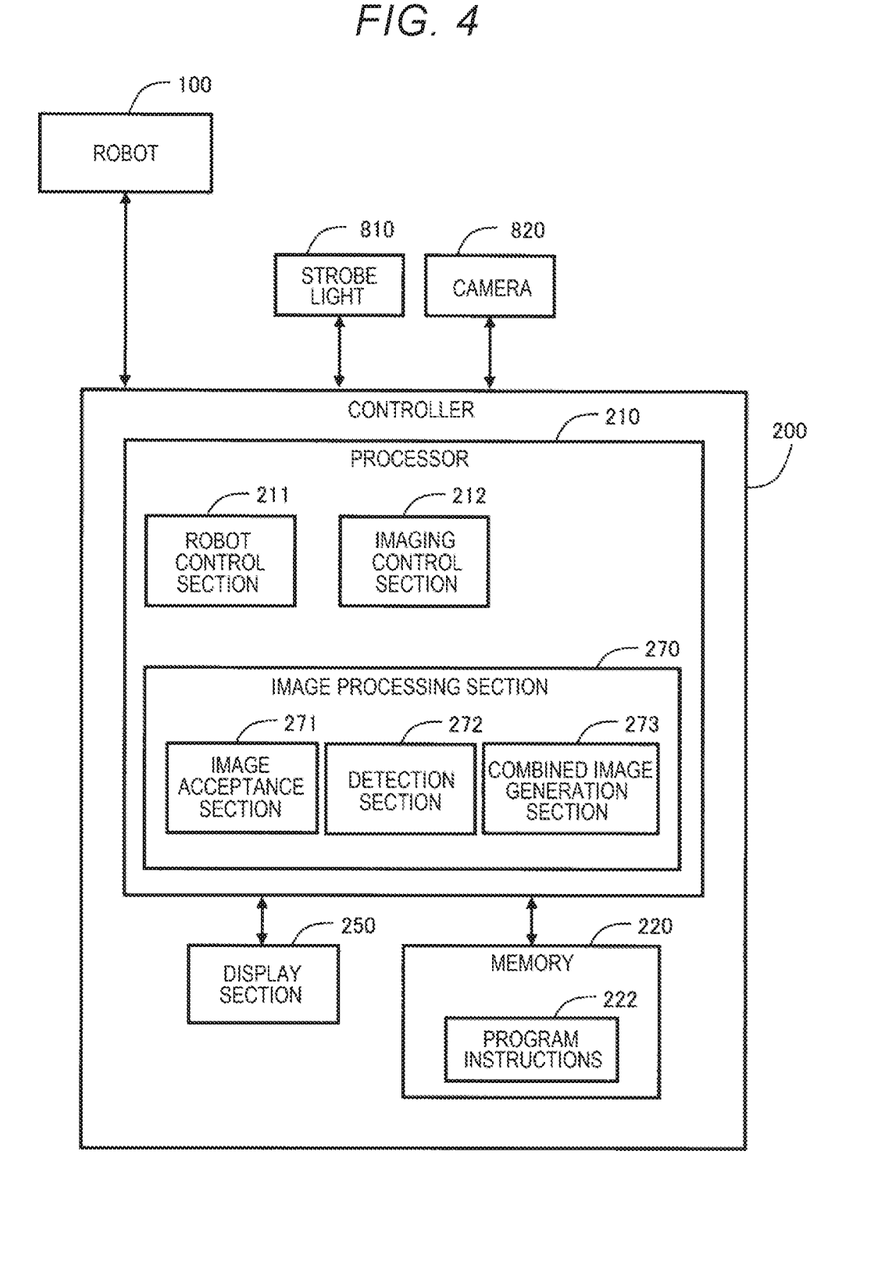
FIG. 4 is a block diagram showing the functions of the controller.

FIG. 4 is a block diagram showing the functions of the controller 200. The processor 210 of the controller 200 executes a variety of program instructions 222 stored in the memory 220 in advance to achieve the functions of a robot control section 211, an imaging control section 212, and an image processing section 270. The image processing section 270 corresponds to an "image processing apparatus."

The image processing section 270 includes an image acceptance section 271, a detection section 272, and a combined image generation section 273. The image acceptance section 271 accepts a captured image generated by causing the camera 820 to capture an image of the workpiece WK as the target object. The detection section 272 processes the captured image to detect identification information for identifying the target object. The combined image generation section 273 generates a combined image that is the combination of the captured image and the identification information and causes the display section 250 to display the combined image. The functions of the portions 271 to 273 will be further described later.

Figure 5:
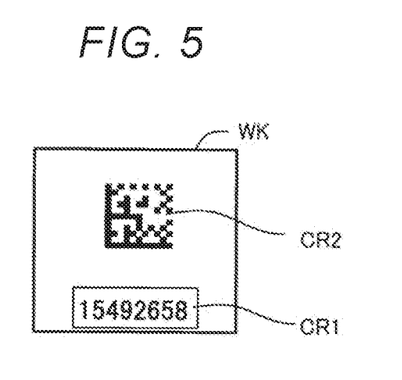
FIG. 5 is a plan view showing an example of a target object.

FIG. 5 is a plan view showing an example of the workpiece WK as the target object. Two pieces of identification information CR1 and CR2 are drawn on the surface of the workpiece WK. The first identification information CR1 is a letter string containing a numeral or a letter, and the second identification information CR2 is a two-dimensional code. The pieces of identification information CR1 and CR2 have a point in common with each other in that they each are information mechanically recognizable by a computer. The following description will be made of a case where the first identification information CR1 is detected from an image. It is, however, noted that the following description applies also to detection of the second identification information CR2. As the identification information for identifying the workpiece WK, any object other than a letter string or a two-dimensional code may be used. For example, a specific pattern or mark may be detected as the identification information for identifying the workpiece WK.

In the present specification, a "letter" in a narrow sense contains no numeral and a "letter" in a broad sense contains a numeral when used. In the phrase "a numeral or a letter," the "letter" is used in a narrow sense. In the term "letter string," the "letter" is used in a broad sense. The term "letter string" may contain one or more numerals or letters. A "letter string" as the identification information, however, preferably contains a plurality of numerals or letters. A "letter string" may not be formed of a single string of letters and may be formed of a plurality of strings of letters.

Figure 6:
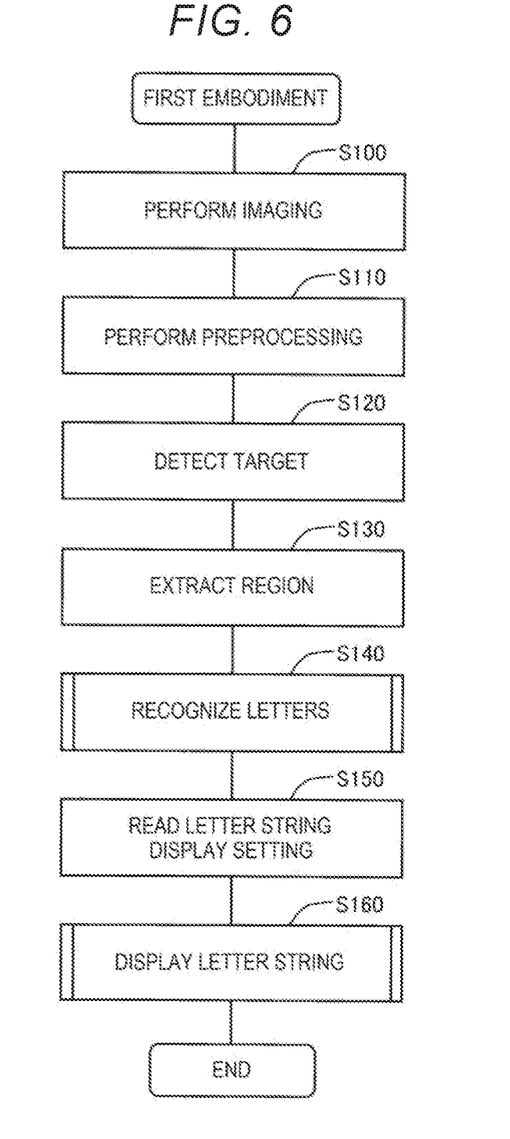
FIG. 6 is a flowchart showing the procedure of image processing in a first embodiment.

FIG. 6 is a flowchart showing the procedure of image processing in the first embodiment. In step S100, the image acceptance section 271 causes the camera 820 to capture an image of the workpiece WK. In the imaging operation, the strobe light 810 may be caused to emit light as required. The captured image of the workpiece WK is accepted by the image acceptance section 271 and temporarily stored in the memory 220.

Steps S110 to S140 are carried out by the detection section 272. In step S110, preprocessing is performed. The preprocessing to be performed includes adjustment of the brightness and contrast of the entire captured image. The preprocessing may be omitted.

In step 120, to read the identification information CR1 on the surface of the workpiece WK, the position of the workpiece WK in the captured image is detected, and the position of the identification information CR1 is detected. The position of the workpiece WK in the captured image can be detected, for example, by searching for a pixel group having a shape that approximates the geometric shape of the workpiece WK. The position of the identification information CR1 on the workpiece WK can be detected, for example, from the known position of the identification information CR1 on the workpiece WK.

In step S130, an image region containing the identification information CR1 is extracted from the captured image. In step S140, the letter string of the identification information CR1 is recognized from the image region obtained in step S130. The letter recognition in step S140 will be described later in detail.

Steps S150 and S160 are carried out by the combined image generation section 273. In step S150, the combined image generation section 273 reads a letter string display setting representing an aspect in which the recognized letter string representing the identification information CR1 is so drawn as to be superimposed on the captured image. The letter string display setting is set in advance and stored in the memory 220.

As the letter string display setting, for example, at least one of the following parameters is set: (1) Result flag: The result flag is a flag representing whether the letter recognition has been successful or unsuccessful. In an initial setting, the result flag may be "successful" or "unsuccessful." Different colors may be set as the colors of the "successful" and "unsuccessful" result flags. For example, the following selective use of color letters are conceivable: The letter string is drawn in green in the case of the "successful" result flag; and the letter string is drawn in red in the case of the "unsuccessful" result flag. (2) Foreground color: The foreground color is the letter color and can be so set as to be, for example, a fixed color specified by a user or the color complementary to the background color. (3) Background color: The background color is the color of the background of the letter and can be so set as to be, for example, a fixed color specified by the user, transparent, the color complementary to the letter color, or a blending. (4) Coordinates of the position where the letter string is inserted and the width, the height, and the angle of rotation of the letter string: The angle of rotation of each letter of the letter string can, for example, be 0 degrees representing that the letter is upright or an angle equal to a detected angle of a rectangular frame that surrounds the letter string that forms the identification information CR1. According to the latter setting, each letter resulting from the letter recognition can be displayed in the same orientation as that of each letter of the identification information CR1 in a combined image MG. (5) Out-of-frame treatment: The out-of-frame treatment is the treatment performed in a case where the recognized letter string drawn in the combined image MG juts off the contour of the combined image MG and is the treatment of drawing the letter string in a set aspect. For example, it is conceivable to specify an aspect in which the letter string is so folded as to be drawn within the combined image MG or an aspect in which the letter string is not folded but is so drawn as to jut off the combined image MG. (6) Attributes of letter: The attributes of each letter can be the font type (such as Ming-style typeface, gothic typeface), the style (such as standard, slanted, bold, and bold and slanted), the size (points), and the letter decoration (such as shadowed, outlined, embossed, and raised). (7) Additively drawn items: An item to be drawn in the combined image MG other than the recognized letter string can be specified. For example, the processed time and date, statistical information on a processing result, which will be described later, and other pieces of information can be specified and drawn.

In step S160, the letter string as the identification information recognized from the identification information CR1 is so displayed in accordance with the letter string display setting read in step S150 as to be superimposed on the workpiece WK in the captured image. The letter string display in step S160 will be described later in detail.

Figure 7:
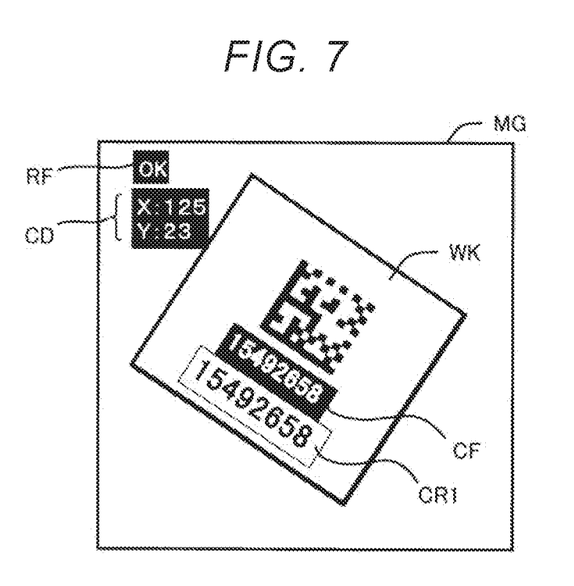
FIG. 7 is a descriptive diagram showing an example of a combined image in which a letter string as identification information has been displayed on a target object.

FIG. 7 is a descriptive diagram showing an example of the combined image MG, in which a letter string CF as the identification information has been drawn on the workpiece WK as the target object. In the example, since the letter string CF is displayed in a position adjacent to the identification information CR1, an operator who looks at the letter string CF can readily determine that the identification information CR1 has been correctly recognized.

In the combined image MG are further drawn a result flag RF, which represents whether or not the letter recognition has been successful, and recognized position coordinates CD, which are the coordinates where the letter string CF has been recognized. In the example, letters "OK" are displayed as the result flag RF. The recognized position coordinates CD, which are the coordinates where the letter string CF has been recognized, represent, for example, the position of the first letter of the letter string CF in a workpiece coordinate system having an origin that coincides with a reference position of the workpiece WK.

Figure 8:
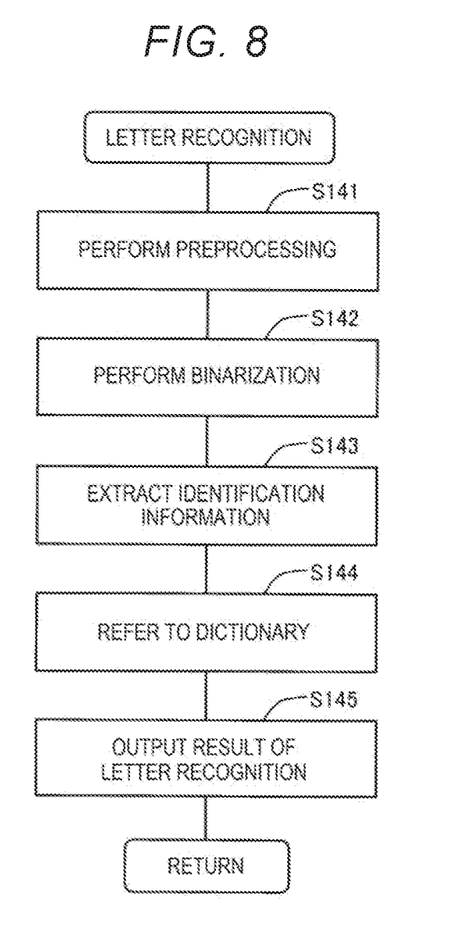
FIG. 8 is a flowchart showing a detailed procedure of letter recognition.

FIG. 8 is a flowchart showing a detailed procedure of the letter recognition in step S140 in FIG. 6. In step S141, preprocessing is performed. As the preprocessing, trapezoidal distortion of the workpiece WK in the combined image MG is eliminated, for example, by trapezoidal correction. In step S142, the combined image MG is binarized. The binarization may be performed by using a method using a threshold specified in advance or a method for creating a histogram of the luminance in the combined image MG to determine a threshold that separates the foreground and the background from each other. In step S143, the identification information CR1 is extracted from the binarized combined image MG. In step S144, the extracted identification information CR1 is compared with the contents of a dictionary prepared in advance to recognize each letter that forms the identification information CR1. In step S145, the recognized letter string CF is outputted as the result of the letter recognition and stored in the memory 220. In a case where the letter recognition is successful, the result flag in the letter string display setting is set at "successful," whereas in a case where the letter recognition is unsuccessful, the result flag in the letter string display setting is set at "unsuccessful."

Figure 9:
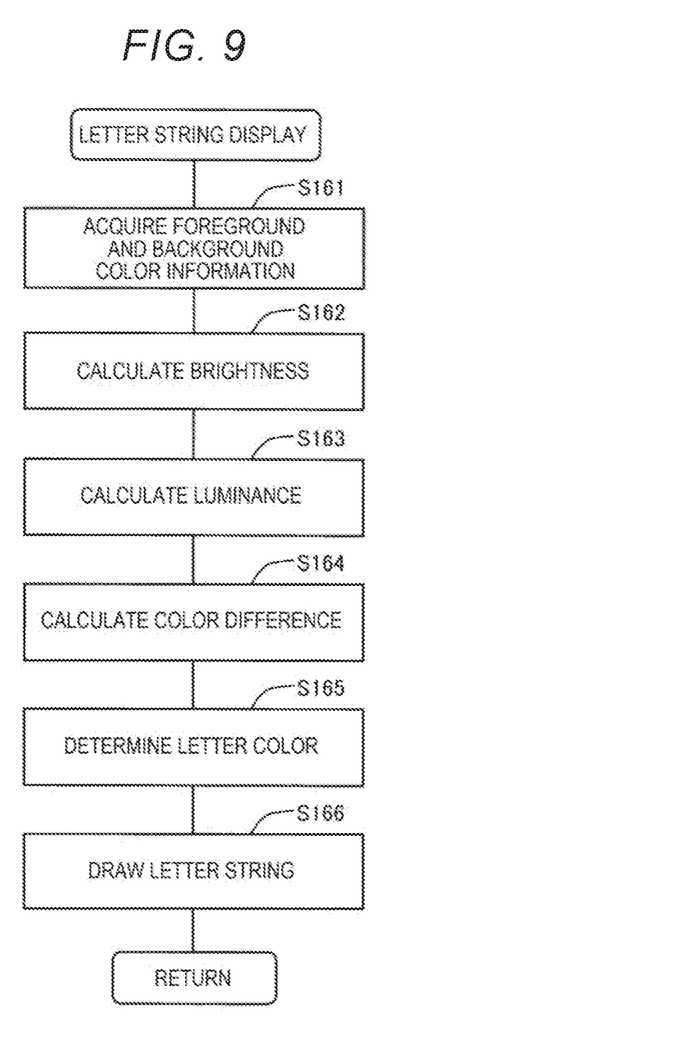
FIG. 9 is a flowchart showing a detailed procedure of letter string display.

FIG. 9 is a flowchart showing a detailed procedure of the letter string display in step S160 in FIG. 6. When the recognized letter string CF is drawn in the combined image MG, the visibility of the letter string CF is likely to significantly decrease depending on the workpiece WK. To avoid the problem, the letter string CF is drawn by using the color complementary to the color of the background in the present embodiment. The result flag RF and the recognized position coordinates CD, which are the coordinates where the letter string CF has been recognized, shown in FIG. 7 are also each preferably drawn in a color that is complementary to the color of the background.

In step S161, foreground and the background color information specified in the letter string display setting is acquired. The "foreground" means the recognized letter string CF. The "background" means the portion excluding the letters in a rectangular region in which the letter string CF is drawn. The color information uses, for example, three values, R, G, and B.

In step S162, the brightness of each of the foreground and the background is calculated. The expression for calculating the brightness can, for example, be the following expression:

$$La = ((R \times 299) + (G \times 587) + (B \times 114))/1000 \tag{1}$$

where La represents the brightness, and R, G, and B represent an R value, a G value, and a B value, respectively.

In step S163, the luminance of each of the foreground and the background is calculated. The expression for calculating the luminance can, for example, be the following expression:

$$Lb = R' \times 0.2126 + G' \times 0.7152 + B' \times 0.0722 \tag{2}$$

where Lb represents the luminance, and R', G', and B' represent the R value, the G value, and the B value converted by the following conversion expression, respectively. Expression that converts R':

$$sR = (R/255)^{-1.5} \tag{3a}$$

(i) When $sR \leq 0.03928$, $$R' = sR/12.92 \tag{3b}$$

(ii) When sR>0.03928, $$R'=\{(sR+0.055)1.055\}^{2.4} \quad (3c)$$

G' and B' are also converted by the same conversion expression.

In step S164, the difference in color between the foreground and the background is calculated. The expression for calculating a color difference ΔC can, for example, be the following expression:

$$\Delta C=(\max(Rb,Rf)-\min(Rb,Rf))+(\max(Gb,Gf)-\min(Gb,Gf))+(\max(Bb,Bf)-\min(Bb,Bf)) \quad (4)$$

where the subscripts b and f represent the background color and the foreground color, respectively.

In step S165, the brightness, the luminance, and the color difference calculated in steps S162 to S164 are used to determine the letter color. To ensure the visibility of the letter string CF, the following three conditions are all preferably satisfied.
(1) Difference in brightness: at least 125
(2) Luminance ratio: at least 4.5
(3) Color difference: at least 500

It is, however, noted that the luminance ratio may be at least 3 in a case where the letter size is at least 18 points or the bold letter size is at least 14 points.

A letter color that satisfies the conditions is selected from a color palette. In a case where there are a plurality of colors that satisfy the conditions, a letter color that maximizes any of the brightness difference, the luminance ratio, and the color difference may be selected. Instead, the plurality of colors may be displayed on the display section 250 and recommended to the operator, and the operator may select a letter color.

In step S166, the thus determined letter color is used to draw the letter string CF and other objects. The letter color determined in steps S161 to S165 is the color complementary to the color of the background. In the processes in steps S161 to S166, the color of the letter string CF is so determined as to be complementary to the color of the background. Instead, the color of the letter string CF may be a specific color, and the background may be drawn in the color complementary to the specific color.

The combined image MG shown in FIG. 7 described above is an image created by carrying out the processes in FIGS. 6, 8, and 9. The combined image MG has undergone the brightness adjustment, the contrast adjustment, the trapezoidal correction, and other types of operation as required, and the letter string CF and the background thereof are drawn in colors complementary to each other, whereby the combined image MG and the letter string DF are so displayed on the display section 250 as to be readily viewed by the operator.

As described above, in the first embodiment, the combined image generation section 273 superimposes the letter string CF as the identification information for identifying the workpiece WK on the workpiece WK as the target object in the combined image MG, whereby the operator can advantageously readily determine whether or not the result of the recognition of the identification information for identifying the target object is correct.

Further, the color of the letter string CF as the identification information and the color of the background of the letter string CF are complementary to each other, whereby the operator can readily determine whether or not the result of the recognition of the identification information for identifying the target object is correct. Moreover, since not only the letter string CF as the identification information but the result flag RF representing whether or not the result of the image processing is correct are drawn, whereby the operator can advantageously readily determine whether or not the result of the recognition of the identification information for identifying the target object is correct.

B. Second Embodiment

Figure 10:
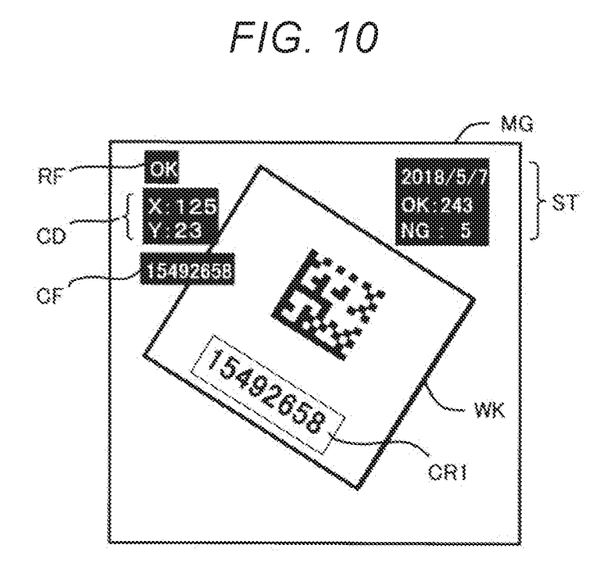
FIG. 10 is a descriptive diagram showing an example of an image in which a letter string as the identification information is displayed on a target object in a second embodiment.

FIG. 10 is a descriptive diagram showing an example of an image in which a letter string as the identification information is displayed on a target object in the second embodiment. The combined image MG shown in FIG. 10 differs from the combined image MG shown in FIG. 7 in the first embodiment in two points: In the second embodiment, the letter string CF is drawn in an in-image position specified in advance different from the position adjacent to the identification information CR1; and statistical information ST is drawn, and the two embodiments are the same in the other points. The statistical information ST represents the result of the image processing performed on a plurality of workpieces WK of the same type conveyed by the conveyer 400 shown in FIG. 1. In this example, for example, FIG. 10 shows that out of a plurality of workpieces WK processed by the system shown in FIG. 1 on May 7, 2018, the results of the image processing performed on 243 workpieces WK were successful, and the results of the image processing performed on 5 workpieces WK were unsuccessful. When a combined image is so generated as to contain statistical information on the results of the image processing performed on a plurality of workpieces WK as described above, the operator can advantageously readily determine whether or not the imaging conditions and the image processing conditions are correct.

Figure 11:
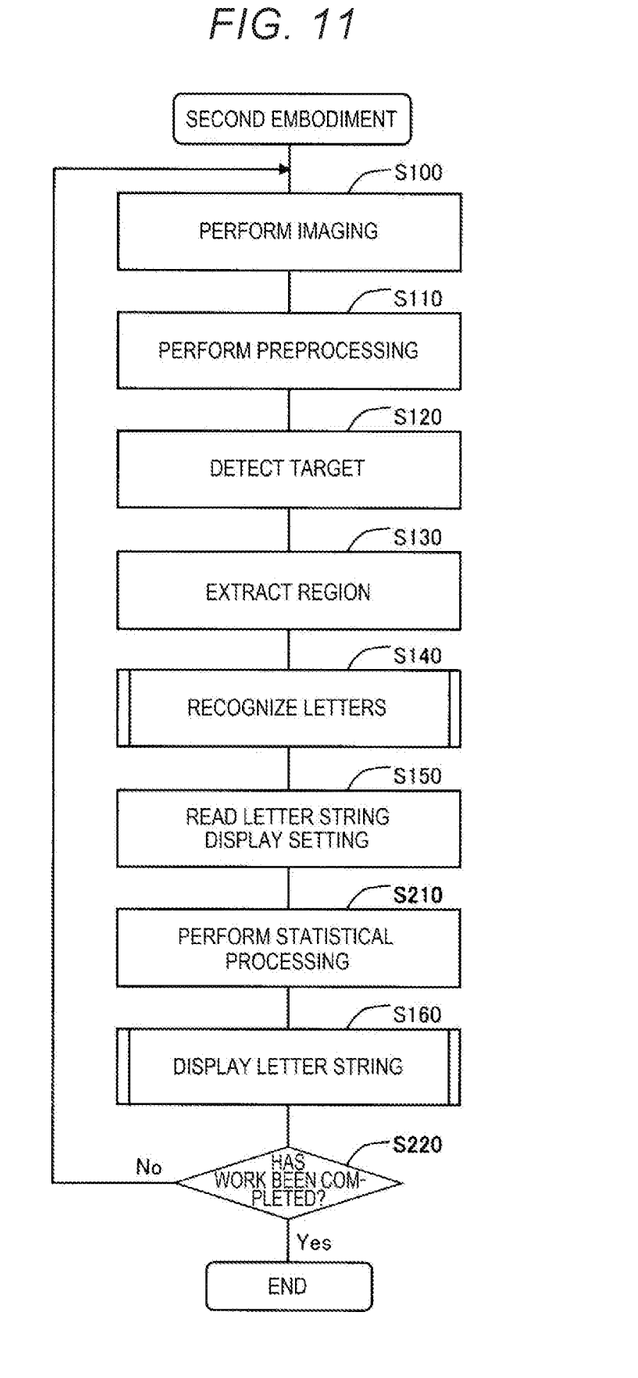
FIG. 11 is a flowchart showing the procedure of image processing in the second embodiment.

FIG. 11 is a flowchart showing the procedure of image processing in the second embodiment. The flowchart in the second embodiment differs from the flowchart in the first embodiment shown in FIG. 6 only in two points: Step S210 is added in the position between steps S150 and S160; and step S220 is added after step S160, and FIG. 11 is the same as FIG. 6 in the other points.

In step S210, the combined image generation section 273 performs statistical processing on a plurality of workpieces WK having been processed before step S210. Examples of the statistical processing may include determination of at least one of the numbers of successful and unsuccessful image processing actions, the success rate of the image processing, the average and standard deviation of the coordinates of the positions where letter strings have been recognized, and other factors. In step S220, it is determined whether or not work on the plurality of workpieces WK has been completed, and in a case where the work has not been completed, the control returns to step S100 and the following processes are repeated.

In the example shown in FIG. 10, the numbers of successful and unsuccessful image processing actions are determined by the statistical processing and drawn in the combined image MG. The number of unsuccessful image processing actions is the number of cases where the identification information CR1 has not been successfully detected. The sentence "the identification information CR1 has not been successfully detected" includes both a case where the position of the identification information CR1 has not been successfully detected and a case where a letter string that is the content of the identification information CR1 has not been successfully detected. When the combined image MG is so generated as to contain the statistical information ST on the results of the image information, the operator can advantageously readily determine whether or not the imaging conditions and the image processing conditions are correct.

Figure 12:
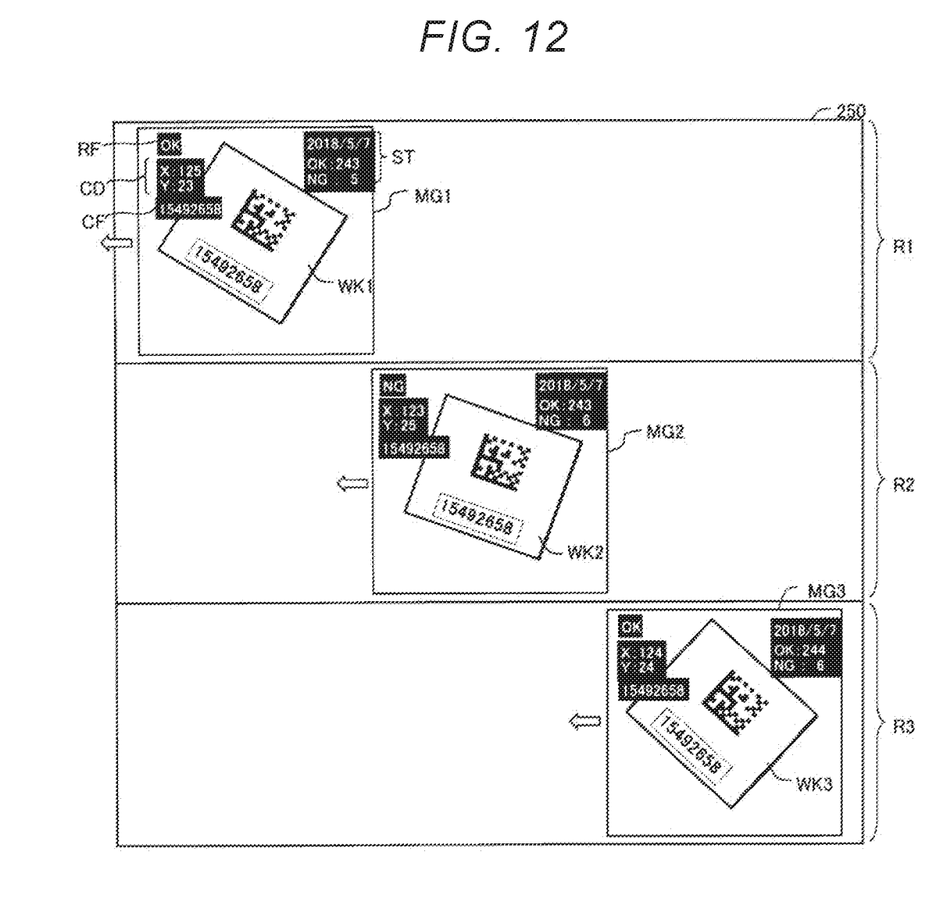
FIG. 12 is a descriptive diagram showing another example of the combined image in which a letter string as identification information has been displayed on a target object.

FIG. 12 is a descriptive diagram showing another example of the combined image, in which a letter string as the identification information has been drawn on the target object. In FIG. 12, the screen of the display section 250 is divided into a plurality of segments R1, R2, and R3. The segments R1, R2, and R3 display combined images MG1, MG2, and MG3 of workpieces WK1, WK2, and WK3 sequentially conveyed by the conveyer 400, respectively. When the individual workpieces WK1, WK2, and WK3 are conveyed by the conveyer 400 and travel forward from the point where the camera 802 captures images of the workpieces, the combined images MG1, MG2, and MG3 displayed in the segments R1, R2, and R3 also move in the screen accordingly. In the example, the segments R1, R2, and R3 are three upper, middle, and lower portions each extending in the horizontal direction, and the combined images MG1, MG2, and MG3 in the segments R1, R2, and R3 move leftward in the screen of the display section 250 as the workpieces WK1, WK2, and WK3 move. The letter string CF, which is the result of the recognition of the identification information CR1, also moves in accordance with the movement of the positions where the combined images MG1, MG2, and MG3 are displayed.

As described above, when the positions where the combined images are displayed on the display section 250 are moved in accordance with the conveyance of the workpieces WK along the conveyance path, and the positions where the identification information is displayed are synchronized with the movement of the positions where the combined images are displayed, the operator can advantageously readily determine whether or not the results of the recognition of the identification information CR1 for identifying the workpieces WK are correct.

C. Other Embodiments

The present disclosure is not limited to the embodiments described above and can be implemented in a variety of other aspects to the extent that the aspects do not depart from the substance of the present disclosure. For example, the present disclosure can be implemented in the following aspects. The technical features in the embodiments described above corresponding to the technical features in the aspects described below can be replaced with other features or combined with each other as appropriate to achieve part or entirety of the advantage of some aspects of the present disclosure or achieve part or entirety of the effects provided by the present disclosure. Further, when any of the technical features are not described as essential in the present specification, the technical feature can be deleted as appropriate.

(1) According to a first aspect of the present disclosure, there is provided an image processing apparatus that detects and displays identification information for identifying an imaged target object. The image processing apparatus includes an image acceptance section that accepts a captured image generated by capturing an image of the target object, a detection section that detects the identification information for identifying the target object by processing the captured image, and a combined image generation section that generates a combined image that is the combination of the captured image and the identification information and causes a display apparatus to display the combined image. In the combined image, the identification information is superimposed on the target object in the captured image. According to the image processing apparatus, the identification information is superimposed on the target object in the captured image, whereby the operator can readily determine whether or not the result of the recognition of the identification information for identifying the target object is correct.

(2) In the image processing apparatus described above, the identification information may be a numeral or a letter. According to the image processing apparatus, the numeral or letter contained in the target object and the detected numeral or letter are displayed in the image, whereby the operator can readily determine whether or not the result of the recognition of the numeral or letter on the target object is correct.

(3) In the image processing apparatus described above, the color of the identification information may be complementary to the color of the background of the identification information. According to the image processing apparatus, the color of the identification information and the color of the background are complementary to each other, whereby the operator can readily determine whether or not the result of the recognition of the identification information for identifying the target object is correct.

(4) In the image processing apparatus described above, the image acceptance section may sequentially accept a plurality of captured images showing the captured target object, the detection section and the combined image generation section may sequentially process the captured images and generate the combined images, and the combined image generation section may generate first statistical information on the result of the processing performed on a first captured image containing a first target object to generate a first combined image containing the first statistical information. According to the image processing apparatus, the first combined image is so generated as to contain the first statistical information on the result of the processing performed on the first captured image containing the first target object, whereby the operator can readily determine whether or not the imaging conditions and the image processing conditions are correct.

(5) In the image processing apparatus described above, the combined image generation section may generate second statistical information containing the first statistical information and the result of the processing performed on a second captured image containing a second target object to generate a second combined image containing the second statistical information. According to the image processing apparatus, the second statistical information on the result of the processing on the captured images of the first and second target objects, and the second combined image is so generated as to contain the second statistical information, whereby the operator can readily determine whether or not the imaging conditions and the image processing conditions are correct.

(6) In the image processing apparatus described above, the first or second statistical information may contain the number of cases where the identification information has not been successfully detected. According to the image processing apparatus, the statistical information containing the number of cases where the identification information has not been successfully detected is displayed in the combined image, whereby the operator can readily determine whether or not the imaging conditions and the image processing conditions are correct.

(7) According to a second aspect of the present disclosure, there is provided an image processing apparatus that causes a display apparatus to display identification information for identifying an imaged target object. The image processing apparatus includes a processor, and the processor (a) accepts a captured image generated by capturing an image of the target object, (b) detects the identification information for identifying the target object by processing the captured image to generate identification information representing the identification information, and (c) generates a combined image that is the combination of the captured image and the identification information and causes the display apparatus to display the combined image. In the combined image, the identification information is superimposed on the target object in the captured image. According to the image processing apparatus, the identification information is superimposed on the target object in the captured image, whereby the operator can readily determine whether or not the result of the recognition of the identification information for identifying the target object is correct.

(8) According to a third aspect of the present disclosure, there is provided a robot connected to a controller including the image processing apparatus described above. According to the robot, which acquires a captured image of a workpiece as the target object, performs image processing on the captured image to generate identification information for identifying the target object, and superimposes the identification information on the target object in the captured image, the operator can readily determine whether or not the result of the recognition of the identification information for identifying the target object is correct.

(9) According to a fourth aspect of the present disclosure, there is provided a robot system including a robot and a controller including the above-mentioned image processing apparatus connected to the robot. According to the robot system, which acquires a captured image of a workpiece as the target object, performs image processing on the captured image to detect identification information for identifying the target object, and superimposes the identification information on the target object in the captured image, the operator can readily determine whether or not the result of the recognition of the identification information for identifying the target object is correct.

The present disclosure can be implemented in a variety of aspects other than those described above. For example, the present disclosure can be implemented, for example, in the form of an image processing method, a computer program for achieving the functions of the image processing apparatus, and a non-transitory storage medium that records the computer program.

What is claimed is:

1. An image processing apparatus that causes a display apparatus to display identification information comprising a letter string for identifying an imaged target object drawn on a surface of the target object, the image processing apparatus comprising
a processor,
wherein the processor
accepts a captured image generated by capturing an image of the target object,
detects the letter string of the target object by performing image processing including the letter identification processing on the captured image, and
generates a combined image obtained by combining the captured image and the letter string and causes the display apparatus to display the combined image, and
in the combined image, the letter string is superimposed on the target object in the captured image,
wherein the processor accepts a plurality of captured images showing the captured target object,
processes the captured images and generate the combined images, and
generates first statistical information on a result of the processing performed on a first captured image containing a first target object to generate a first combined image containing the first statistical information.

2. The image processing apparatus according to claim 1, wherein a color of the identification information is complementary to a color of a background of the identification information.

3. The image processing apparatus according to claim 1, wherein the processor generates second statistical information containing the first statistical information and a result of the processing performed on a second captured image containing a second target object to generate a second combined image containing the second statistical information.

4. The image processing apparatus according to claim 3, wherein the first or second statistical information contains the number of cases where the identification information has not been successfully detected.

5. A robot controlled based on an identification information comprising a letter string for identifying an imaged target object drawn on a surface of the target object, the identification information detected by an image processing apparatus that causes a display apparatus to display the identification information,
wherein the image processing apparatus includes
a processor,
the processor
accepts a captured image generated by capturing an image of the target object,
detects the letter string-of the target object by performing image processing including the letter identification processing the captured image, and
generates a combined image obtained by combining the captured image and the letter string and causes the display apparatus to display the combined image, and
in the combined image, the letter string is superimposed on the target object in the captured image,
wherein the processor accepts a plurality of captured images showing the captured target object,
processes the captured images and generate the combined images, and
generates first statistical information on a result of the processing performed on a first captured image containing a first target object to generate a first combined image containing the first statistical information.

6. The robot according to claim 5,
wherein a color of the identification information is complementary to a color of a background of the identification information.

7. The robot according to claim 5,
wherein the processor generates second statistical information containing the first statistical information and a result of the processing performed on a second captured image containing a second target object to generate a second combined image containing the second statistical information.

8. The robot according to claim 7,
wherein the first or second statistical information contains the number of cases where the identification information has not been successfully detected.

9. A robot system comprising:

a robot;

an image processing apparatus that causes a display apparatus to display identification information comprising a letter string for identifying an imaged target object drawn on a surface of the target object; and a controller that controls the robot based on the identification information detected by the image processing apparatus, wherein the image processing apparatus includes a processor,     accepts a captured image generated by capturing an image of the target object,         detects the letter string of the target object by performing image processing including the letter identification processing on the captured image, and         generates a combined image obtained by combining the captured image and the letter string and causes the display apparatus to display the combined image, and     in the combined image, the letter string is superimposed on the target object in the captured image, wherein the processor accepts a plurality of captured images showing the captured target object, processes the captured images and generate the combined images, and generates first statistical information on a result of the processing performed on a first captured image containing a first target object to generate a first combined image containing the first statistical information.

10. The robot system according to claim 9, wherein a color of the identification information is complementary to a color of a background of the identification information.

11. The robot system according to claim 9, wherein the processor generates second statistical information containing the first statistical information and a result of the processing performed on a second captured image containing a second target object to generate a second combined image containing the second statistical information.

12. The robot system according to claim 11, wherein the first or second statistical information contains the number of cases where the identification information has not been successfully detected.

13. The image processing apparatus according to claim 1, wherein the captured image generated by using one camera.

* * * * *